US007097052B2

(12) United States Patent
Lau

(10) Patent No.: US 7,097,052 B2
(45) Date of Patent: Aug. 29, 2006

(54) DIVIDER FOR CD RACK

(75) Inventor: Wai Ming Lau, Kowloon (HK)

(73) Assignee: Sunhing Millenium Ltd., Kowloon (HK)

( * ) Notice: Subject to any disclaimer, the term of this patent is extended or adjusted under 35 U.S.C. 154(b) by 0 days.

(21) Appl. No.: 10/420,690

(22) Filed: Apr. 23, 2003

(65) Prior Publication Data
US 2004/0124161 A1 Jul. 1, 2004

Related U.S. Application Data

(60) Provisional application No. 60/374,489, filed on Apr. 23, 2002.

(51) Int. Cl.
A47F 5/00 (2006.01)
(52) U.S. Cl. .................. 211/184; 211/40; 211/43; 248/74.2
(58) Field of Classification Search .............. 211/184, 211/43, 40, 41.12; 403/233, 234, 191, DIG. 4; 248/230.4, 230.7, 74.1–74.4; 24/487, 543, 24/482, 512
See application file for complete search history.

(56) References Cited

U.S. PATENT DOCUMENTS 1,761,497 A * 6/1930 Smith ........................ 224/222
3,530,997 A 9/1970 Djorup
4,240,604 A * 12/1980 Brach ...................... 248/316.5
4,624,432 A * 11/1986 Salacuse .................. 248/316.5
4,653,716 A * 3/1987 Sakaguchi ............... 248/316.5
5,035,332 A * 7/1991 Stravitz ...................... 211/40
5,082,125 A * 1/1992 Ninni ......................... 211/184
5,277,387 A * 1/1994 Lewis et al. ............... 248/74.2
5,415,297 A 5/1995 Klein et al.
D364,047 S * 11/1995 Bucher ....................... D6/407
5,572,776 A * 11/1996 Murphy et al. ............... 24/543
D439,465 S * 3/2001 Mok ........................... D6/630
6,257,420 B1 * 7/2001 Dardashti et al. ............ 211/40

FOREIGN PATENT DOCUMENTS

| CA | 2318659 A1 | 12/2001 |
| DE | G8800551 U1 | 1/1988 |
| WO | WO8102829 A1 | 10/1981 |

* cited by examiner

Primary Examiner—Jennifer E. Novosad
(74) Attorney, Agent, or Firm—Buchanan Ingersoll PC

(57) ABSTRACT

A rack for digital media containers such as compact disc jewel boxes. The unit contains a base and opposed sides, between which a plurality of tubular members are provided to hold the containers. Dividers are provided between adjacent tubular members and have attachment means at least one end formed from two arc like members, supported on a resilient support to the divider and having a pivotal connection between the points of support from the divider so as to be able to assume an open and a closed stable position.

2 Claims, 3 Drawing Sheets

DIVIDER FOR CD RACK

This application claims the benefit of the filing date of U.S. Provisional Application No. 60/374,489, filed Apr. 23, 2002, under 35U.S.C. §119(e), the contents of which are incorporated herein by reference.

FIELD OF THE INVENTION

This invention relates to digital media container racks and, in particular, a divider, spacer or support for such racks.

BACKGROUND TO THE INVENTION

Digital media container racks come in a variety of forms. They are generally configured to hold a number of generally standard-sized thin rectangular prism-shaped holders for compact disks, digital video disks, video compact disks, mini-disks or similar.

Amongst the variety of forms are racks that provide a generally upright rack having a plurality of substantially horizontal tubular cross members onto which the digital media containers can reside. There may be a desire to place vertical dividers between adjacent tubular members to either separate different sets of containers or to further support the tubular members themselves.

The difficulty in providing such dividers is that they need to be easily movable along the tubular members or even entirely removable from the rack while sufficiently stable and secure when attached to provide some form of support. Current mechanisms generally provide static dividers at fixed points or easily movable dividers that are not secure once attached to the tubular members.

OBJECT OF THE INVENTION

It is an object of the present invention to provide a divider for a digital media container rack or a rack with such dividers that may overcome some of the disadvantages of the prior art and provide a relatively easily releasable yet secure divider at an economical cost.

SUMMARY OF THE INVENTION

Accordingly, in a first aspect, the invention may broadly be said to consist in a digital media container rack comprising:

a generally upright rack having abase and at least opposed sides extending from said base;

a plurality of generally tubular members attached to and extending between said opposed sides;

at least one divider for extending between said generally tubular members having attachment means at or adjacent opposed ends of said divider for attachment to said generally tubular members; and wherein at least one of said attachment means includes two arc-shaped members pivotally interconnected by a hinge and wherein each set arc-shaped member is resiliently supported from said divider intermediate of said pivotal connection and an opposed end of said arc-shaped member.

Accordingly, in a second aspect, the invention may broadly be said to consist in a divider for a digital media container rack having a plurality of generally tubular support members comprising:

at least one elongate member for extending between said generally tubular members having attachment means at or adjacent opposed ends of said elongate member for attachment to said generally tubular members; and wherein at least one of said attachment means includes two arc-shaped members pivotally interconnected by a hinge and wherein each set arc-shaped member is resiliently supported from said divider intermediate of said pivotal connection and an opposed end of said arc-shaped member.

BRIEF DESCRIPTION OF THE DRAWINGS

This invention will now be described by way of preferred embodiments with reference to the following drawings in which.

DETAILED DESCRIPTION OF PREFERRED EMBODIMENTS

Figure 1:
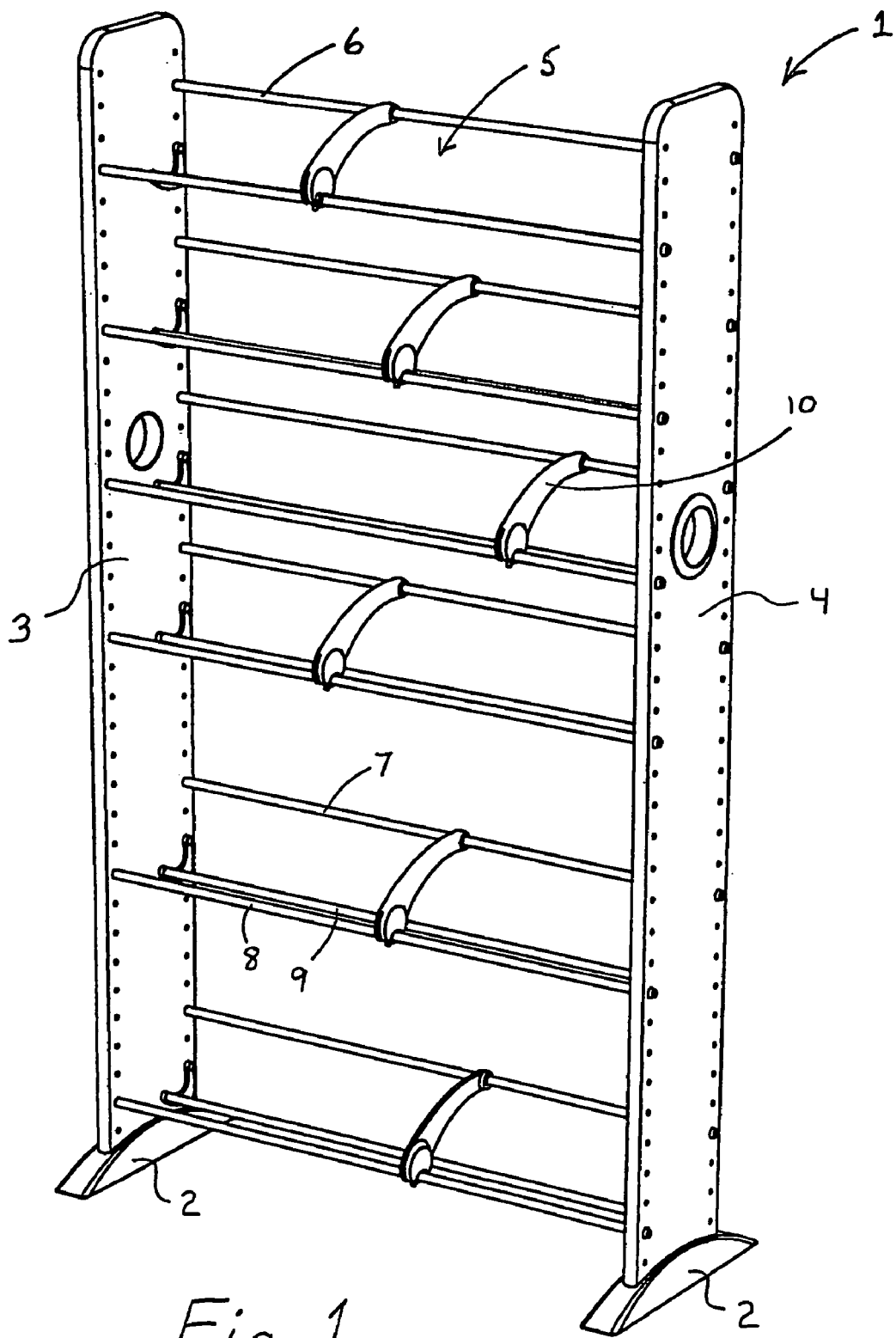
FIG. 1 shows a digital media rack in accordance with a first embodiment of the invention.

A particular preferred embodiment of the invention is shown in FIG. 1. This particular version comprises a digital media container rack 1 having a base portion 2 formed by the separate foot-light portions as shown supporting substantially upright opposed walls 3 and 4. The opposed sides or walls 3 and 4 may comprise substantially planar solid walls as shown or any form of structure such as a thrust or frame or similar to provide support points for racks to carry the digital media containers.

The base portion 2 in this instance is provided as feet at the base of each of the sidewalls 3 and 4 although could equally be provided by the underside edge of those walls themselves or any form of leg or interconnecting base portion as may be desired to support the generally upright walls and assist in the prevention of overturning of the rack 1.

Individual racks 5 are generally formed by the use of generally tubular interconnecting members 6 that progress between the opposed sidewalls. Rather than being formed from solid shelves, a few appropriately positioned members 6 can provide sufficient support against opposed edges of a digital media container so as to retain the container within the structure.

In this preferred embodiment, three such tubular members 6 are provided to form each individual rack being an upper tubular member 7, a lower front tubular member 8 and a lower rear tubular member 9. The exact configuration of these tubular members is not essential to the invention and more or less tubular members could be used as could different configurations if desired. This particular configuration seeks to retain the containers in such a manner as to leave the space above and in front of the container clear for easy removal.

Referring to FIG. 1, a plurality of divider members 10 is also apparent. The dividers may extend between any adjacent tubular members and are generally provided to extend between the lower front and upper tubular members 7 and 8 as shown.

The divider 10 seeks to provide some additional support against a plurality of digital media containers such as jewel cases placed in each rack. The divider may support the outer side of a progression of such containers to stop the containers falling over or may act as a divider between different categories of containers. As an additional function, the divider 10 may provide some support between adjacent tubular members by providing some additional stiffening of the tubular member resultant from it being interconnected with another such member.

Given the purposes of such dividers, it is preferable that they are capable of clamping onto the tubular members such that they are not easily moved from a particularly desired position until such movement is wished for. Such movement may be regularly required as containers are taken out from the rack or additional containers provided and the particular region of divisional support has changed.

Figure 2:
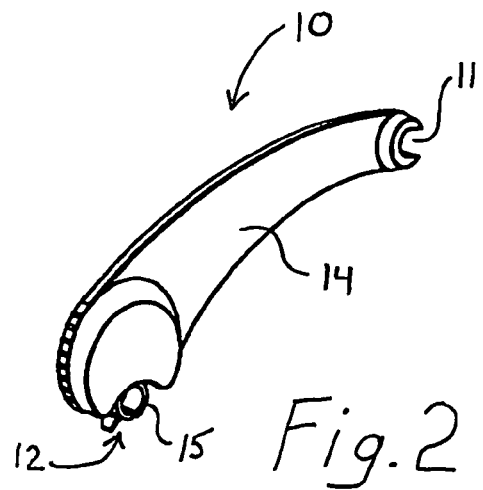
FIG. 2 shows a perspective view of a divider in a first configuration in accordance with the first embodiment of the invention.

Referring to FIG. 2, the divider 10 can be seen to comprise a substantially elongate member 14 having attachment means 11 and 12 at or adjacent distal ends for attachment to the tubular members. A first attachment means 11 is shown as comprising no more than a simple C-section opening at the end of the member to engage around the tubular member without being firmly fixed. It is the second engagement means 12 that may provide the majority of the engagement to prevent dislodgement of the divider 10.

The second engagement means 12 seeks to provide a more substantial connection and is shown in FIG. 2 as a substantially ring-shape structure 15 that engages around the tubular member. However, it should be noted that such a connection is preferably provided in a manner to grip the tubular member so as to minimize easy movement of the divider along the tubular member until desired as well as preventing any relative movement transverse to the tubular member that may allow either of the attachment means 11 or 12 to disconnect. The engagement means 12 should also be provided in a manner as to be releasable when required.

Figure 3:
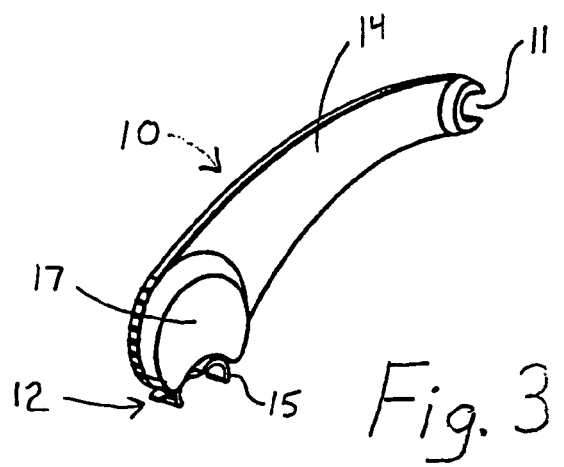
FIG. 3 shows a perspective view of the divider of FIG. 2 in a second configuration.

FIG. 3 shows the divider 10 in a second configuration. The divider 10 now has an open attachment means 12 with the ring-like member 15 split to provide excess 16 for the tubular member into the attachment. This attachment mechanism is further described with reference to FIGS. 4 to 6.

Figure 4:
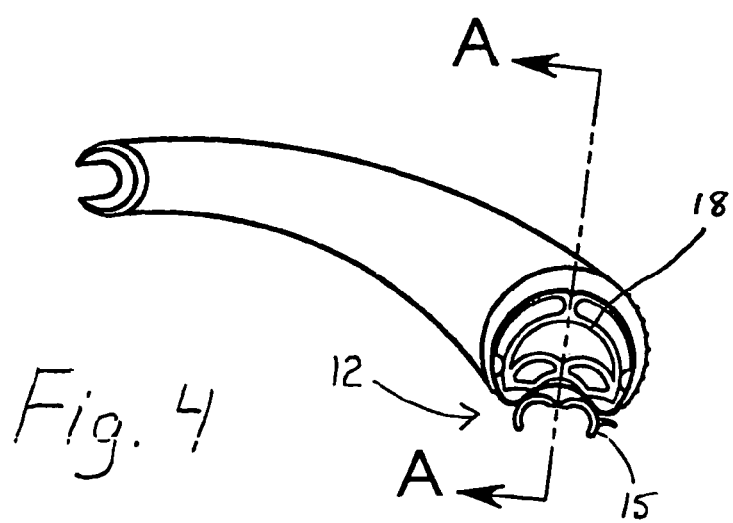
FIG. 4 shows a longitudinal cross-sectional view through the apparatus of FIG. 3.

Referring to FIG. 4, a divider 10 is shown in partial cross-section such that the internal support structure 18 for the attachment means 12 is shown. The support structure 18 may be contained within a hub 17 adjacent that end of the elongate member 10.

Figure 5:
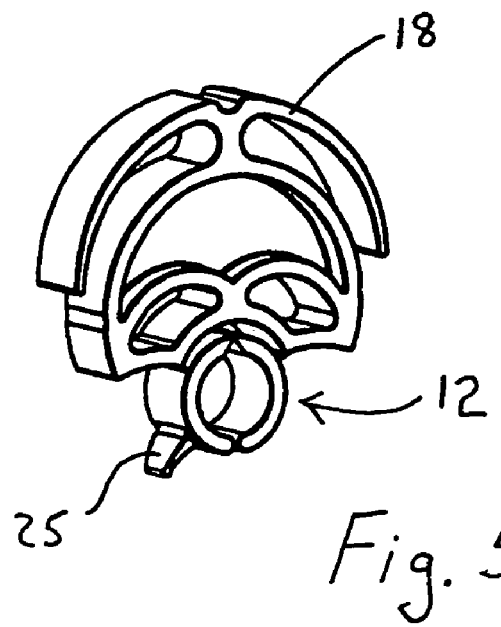
FIG. 5 is a perspective view of a portion of the apparatus of FIG. 4.
Figure 6:
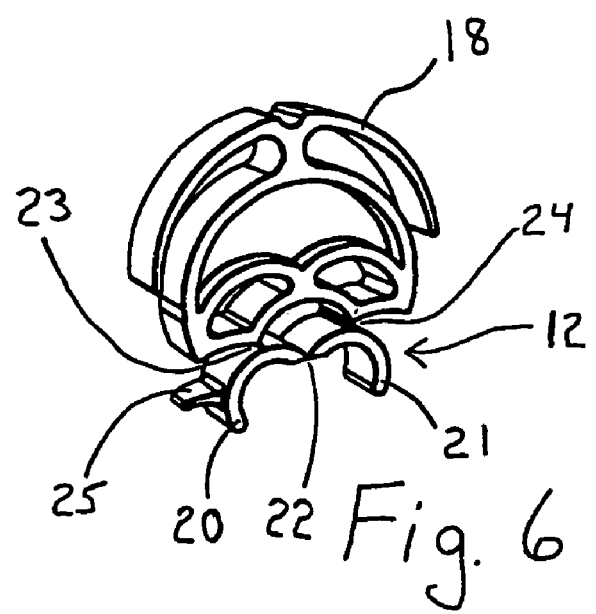
FIG. 6 is a perspective view of the portion of the apparatus of FIG. 5 when in the second configuration.

Referring to FIGS. 5 and 6, the support structure 18 and the attachment means 12 can be seen in a first or closed configuration and a second or closed configuration respectively. The attachment means 12 in this preferred form comprises two arc shaped members 20, 21 having a pivotal interconnection 22 adjoining adjacent ends. The distal ends of the arc shaped members 20 and 21 are not connected. As shown in FIG. 5, the arc like members 20 and 21 are capable of coming together by rotation about the pivotal connection 22 so as to form a substantially ring shaped structure. It is not necessary that the distal ends of the arc shaped members actually meet and some gap between those may be accommodated. The arc shaped members merely need to progress such that the gap between the distal ends of the members in the closed configuration is less than the width of the tubular member to which they are to be attached so as to secure the tubular member within.

The support structure 18 as shown in FIGS. 5 and 6 comprises a resilient support attached to each of the arc shaped members at positions intermediate of the pivotal connection between the members and their distal ends. The support is not rigid as the arc like members require some flexibility in the support to move between the first and second configurations.

The points of connection 23 and 24 between each of the arc shaped members and the support are capable of resilient movement away from each other. As shown in FIG. 6, the pivotal connection 22 must pass between these points 23 and 24 to reach the position shown in FIG. 5. This movement requires additional spacing between the points to accommodate the movement. The use of a resilient material in the support 18 or any other form of bias against this separation of the points 23 and 24 from each other applies a bias to hold the arc shaped members in the stable positions shown in FIGS. 5 and 6 and resist movement between the two. However, such a bias is not so great as to be unable to be overcome by a user upon application of force to a release lever 25. Simply pushing on this lever 25 attached to one of the arc shaped members causes rotation of the member and release of the tubular member to which the attachment means 12 may be connected.

It will be appreciated, that the attachment means in the form of attachment means 12 could be used at both ends of the divider 10 if desired. However, deepening of the C-shaped channel at the attachment means 11 means that this cannot release a tubular member until the end adjacent the attachment means 12 has also been released.

Hence it can be seen that the invention provides a relatively simple yet effective method of attaching a divider between members in a digital media rack.

This invention has been described with reference to preferred embodiments and it should be noted that other embodiments will become apparent to those skilled in the art to which the invention relates. This description of preferred embodiment is not to be considered limiting to the scope of the invention. Specific integers referred to in the description are deemed to incorporate known equivalents where appropriate.

The invention claimed is:

1. A digital media container rack comprising:
    a generally upright rack having a base and at least opposed sides extending from said base;
    a plurality of generally tubular members attached to and extending between said opposed sides;
    at least one divider for extending between said generally tubular members having attachment means at or adjacent opposed ends of said divider for attachment to said generally tubular members; and
        wherein at least one of said attachment means includes two arc-shaped members pivotally interconnected by a hinge and wherein each said arc-shaped member is resiliently supported from said divider intermediate of said pivotal interconnection and an opposed end of said arc-shaped member.

2. A divider for a digital media container rack having a plurality of generally tubular support members comprising:
    at least one elongate member for extending between said generally tubular members having attachment means at or adjacent opposed ends of said elongate member for attachment to said generally tubular members; and wherein at least one of said attachment means includes two arc-shaped members pivotally interconnected by a hinge and wherein each said arc-shaped member is resiliently supported from said divider intermediate of said pivotal interconnection and an opposed end of said arc-shaped member.

* * * * *

UNITED STATES PATENT AND TRADEMARK OFFICE
CERTIFICATE OF CORRECTION

| | | |
|---|---|---|
| PATENT NO. | : 7,097,052 B2 | Page 1 of 1 |
| APPLICATION NO. | : 10/420690 | |
| DATED | : August 29, 2006 | |
| INVENTOR(S) | : Wai Ming Lau | |

It is certified that error appears in the above-identified patent and that said Letters Patent is hereby corrected as shown below:

On title page
Section (73) Assignee: change "Millenium" to --Millennium--.

Signed and Sealed this

Ninth Day of January, 2007

JON W. DUDAS
*Director of the United States Patent and Trademark Office*